July 16, 1935. T. C. VAN DEGRIFT 2,008,161
BALANCING MACHINE FOR PROPELLER SHAFTS
Filed Feb. 10, 1930 4 Sheets-Sheet 1
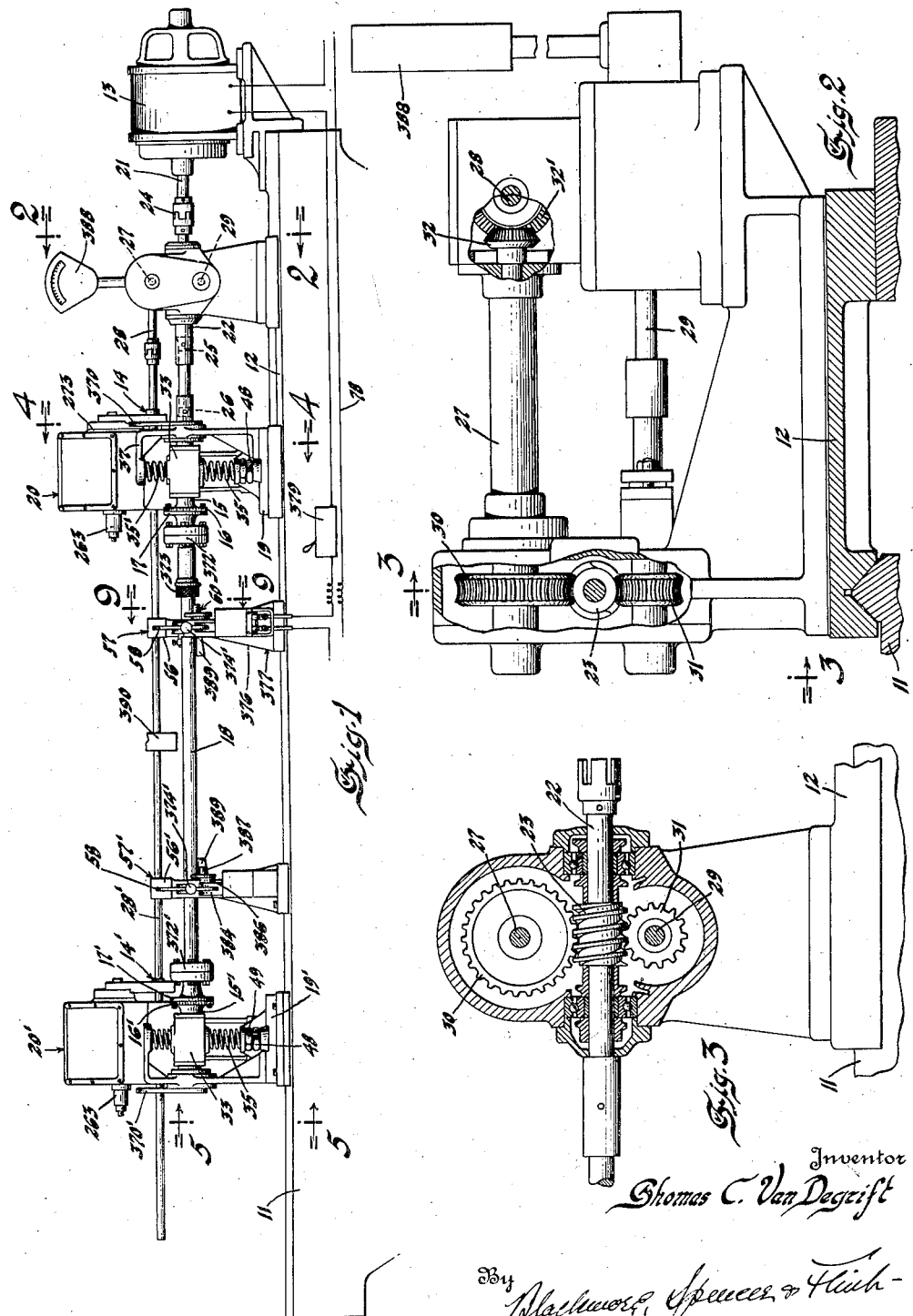
Inventor
Thomas C. Van Degrift
By Blackmore, Spencer & Hink
Attorneys

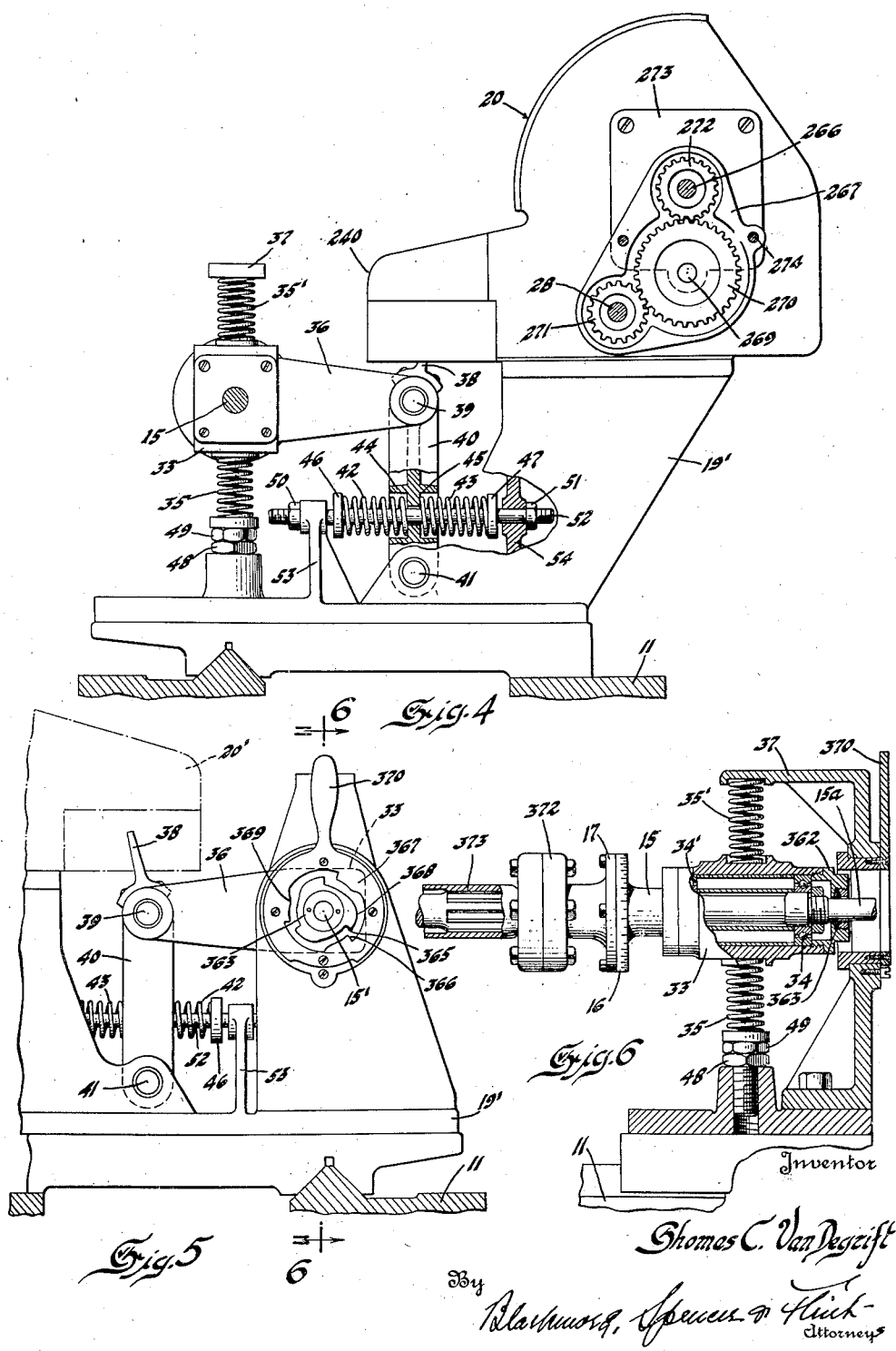

Inventor
Thomas C. Van Degrift

July 16, 1935.  T. C. VAN DEGRIFT  2,008,161
BALANCING MACHINE FOR PROPELLER SHAFTS
Filed Feb. 10, 1930  4 Sheets-Sheet 4

Inventor
Thomas C. Van Degrift
By Blackwood, Spencer & Fisk
Attorneys

Patented July 16, 1935

2,008,161

UNITED STATES PATENT OFFICE 2,008,161

BALANCING MACHINE FOR PROPELLER SHAFTS

Thomas C. Van Degrift, Detroit, Mich., assignor, by mesne assignments, to General Motors Corporation, Detroit, Mich., a corporation of Delaware Application February 10, 1930, Serial No. 427,259

16 Claims. (Cl. 73—51)

Although the present invention is referred to as a balancing machine for propeller shafts, it should be understood as applicable to the ascertainment of unbalance in various substantially cylindrical or elongated elements or organizations of the general character referred to; and it is an especial object of the invention to provide means for the testing of such elements at speeds and under conditions comparable with those to which they are to be subjected in subsequent use.

This machine aims to provide means for the experimental production and study of "whip", and also means for the ascertainment of both the angular location and the amount of any unbalance that, if uncorrected, would be likely to produce such whip at any intended speed of operation.

It has only recently been recognized that propeller shafts, even though produced by modern means and methods, are liable to be so unbalanced, either statically or dynamically or both, as to produce a noisy and unpleasant whip during rapid rotation,—the location, direction and amount of this whip varying not only with the local or general flexibility of the shaft (as resulting from its configuration, its method of production and/or the kind and amount of metal therein) but with the degree and nature of any unbalance therein; and it is an object of this invention to provide not only guidance to improved design and shaft production methods but also means which facilitate such a checking and/or balancing of each shaft in a shop production line as substantially to obviate any whip that might result from the causes last referred to.

It is a further object of this invention to provide a machine for ascertaining unbalance in which the propeller shaft or other unit undergoing test may be held (in a horizontal or other position) in the general manner in its intended subsequent use; and, for the testing of terminally flanged shafts or other units without end-for-end reversal, this invention may employ, at one or both ends of said units, a flanged bearing shaft or shafts supported by floating means. Said bearing shaft or shafts are thus free to respond to any tendency of one or both ends of the shaft or unit to "wobble" or vibrate at moderate speeds, or to whip during rapid rotation; and the movements referred to may be transmitted, by suitable pitman-like arms, to indicators of a type heretofore described,—in which a rotating mirror, a finger-shifted reflector and a fixed light are so assembled as to project a graph.

This machine provides means for simultaneously indicating any "net" or "virtual" or "resultant" unbalance or whip at both ends of a shaft which is supported and rotated as if in actual use; and, in preferred embodiments of the invention, one of the mentioned bearing shafts being provided with drive means such as a variable-speed motor flexibly coupled to one of the mentioned shafts (or to an intermediate shaft including a worm section from which an indicator mirror may be synchronously driven) one of said shafts may also transmit motion to an additional instrument, such as an electrical tachometer, for indicating the speed at which a particular vibration effect is observed.

Other objects of the present invention, including means for at times steadying or otherwise positioning the floating bearing shaft or shafts referred to, safety means and optionally also means to reduce the unbalance and thereby eliminate the whip of a shaft or other unit which has undergone test, may be best appreciated from the following description of an illustrative embodiment of said invention, taken in connection with the appended claims and the accompanying drawings.

Figure 1 is a side elevational general view, with some details omitted and showing only the upper portion of a rugged supporting bench or bed.

Figure 2 is a transverse section, taken substantially as indicated by the line 2—2 of Figure 1, but on a somewhat enlarged scale.

Figure 3 is a longitudinal section, taken substantially as indicated by the line 3—3 of Figure 2.

Figure 4 is a transverse section, taken substantially as indicated by the line 4—4 of Figure 1 and showing a preferred type of floating bearings and means for transmitting motion therefrom to an indicator.

Figure 5 is a partial end elevation, taken substantially as indicated by the line 5—5 of Figure 1.

Figure 6 is a longitudinal sectional detail view, taken from the direction indicated by the line 6—6 of Figure 5.

Figure 9 is a transverse sectional view, taken substantially as indicated by the line 9—9 of Figure 1 and showing one available type of safety dog and associated means hereinafter referred to.

Figure 9:
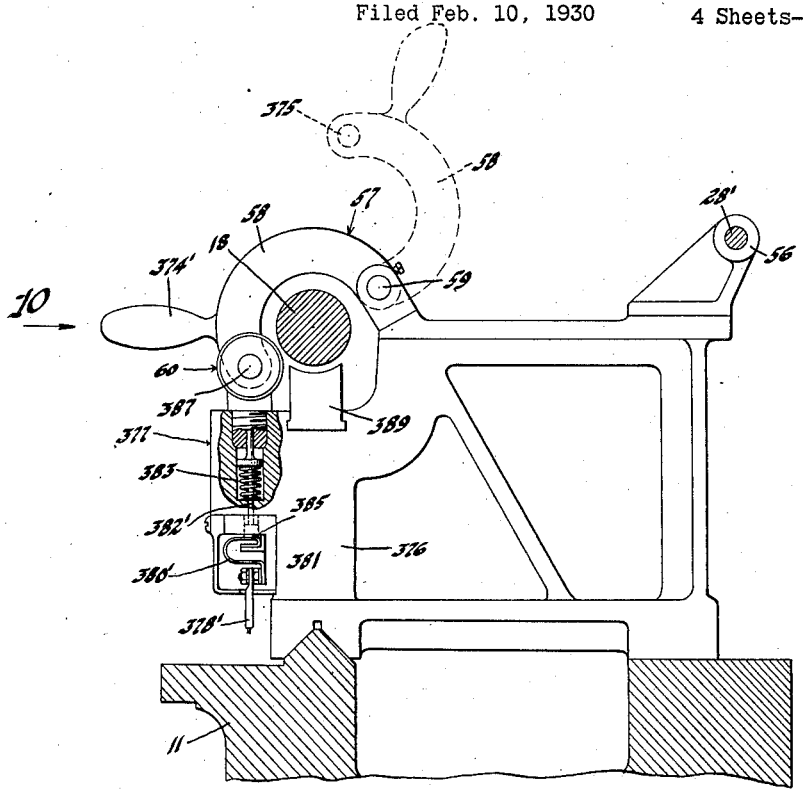

Referring first to the general features shown in Figures 1, 2 and 3, a heavy bed or bench 11 is shown as supporting, upon a common base plate 12, both an electric motor 13, preferably of a variable speed type, and a floating bearing organization 14. The latter may include a bearing shaft 15 and a flange 16,—suitable to engage a usual flange 17 upon one end of a propeller shaft 18 or other unit undergoing test. In proximity to the floating bearing organization 14, and optionally supported upon a subsidiary base element 19, is shown a so-called "sine-wave" indicator 20; and, in preference to transmitting motion directly from a drive shaft 21 of motor 13 to the mentioned bearing shaft 15, a short shaft 22, carrying a worm 23, may advantageously be interposed, (by means such as a coupling 24 and a pair of universal joints 25 and 26,—one or more of the parts last referred to being such as to permit longitudinal play) in such manner as to provide for the rotation of sine-wave indicator drive shafts 27, 28 and 28' and/or the operation of a "speed" indicator through a drive shaft 29. This may be effected by means of gears 30 and 31, engaging the worm 23, and any requisite intermediate gearing, such as that suggested at 32, 32' Figure 2; and speed reduction in a ratio such as 8 to 1 may be incidentally effected between shafts 22 and 28.

To support that end of a shaft or unit 18 which is remote from the motor 13, in preference to providing a mere fixed-axis bearing or reversing the position of the unit to complete a test, a floating bearing organization 14', including a bearing shaft 15' and a flange 16' may be employed,—any vibratory motion imparted to said bearing shaft being shown upon an indicator 20'. This is shown as driven by an extension or part 28' of the mentioned indicator drive shaft 28; and the details of construction of the floating bearing assemblies, as also those of any finger-shifting mechanisms interposed between bearing boxes 33 and the indicators 20, 20', may be substantially identical and of the general character suggested in Figures 4, 5, and 6.

In the figures last referred to, floating bearing organizations 14, 14' are shown as each including a substantially rectangular bearing box 33, containing bearings 34, 34' separated by spacers and held by means comprising nuts; and the box 33 is shown as integrally or otherwise rigidly connected with an arm 36 and as supported by resilient means including a compression spring 35,—an opposition spring 35' being optionally interposed above said box and below a horizontal upper portion of a bracket 37. The arm 36 is shown as provided at or near its end remote from box 33 with both an indicator actuating finger 38 and a transverse pivot pin 39; and one of the parts last mentioned may be connected with some suitable restorative means, yieldably holding said box and parts therein against motion requisite to the operation of an indicator 20, 20'. For example, an upwardly extending link 40, shown as also receiving the pin 39 may be pivoted thereabove or therebelow, as at 41, and provided with restorative means such as a pair of opposed compression springs 42 and 43. These may be set in depressions 44 and 45, oppositely provided in said link; and they may be outwardly engaged by stops 46 and 47. The upward pressure of the spring 35 or its equivalent may be adjusted by means such as nuts 48 and 49; and comparable adjustment of the springs 42 and 43 may be effected by means such as nuts 50 and 51 upon a threaded rod 52,—shown as extending through brackets 53 and 54 and also loosely through the springs 42 and 43 and link 40,—the arm 36 functioning as a pitman.

It will be seen that the described construction is such that any merely vertical movement of the bearing shaft 15 or 15', due to a slight deficiency or excess of weight in a unit 18, tends to produce only a corresponding rotative adjustment of the finger 38 upon the pin 39 so long as there is no lateral "wobble" or eccentric rotation of shaft 15 or 15'; and that any eccentric movement of the bearing shaft 15 or 15' tends to produce lateral movement of the entire finger 38, as a result of a reciprocation of the pin 39,—with a limited rotation of the link 40 upon its pivot 41. The movement cyclically imparted by finger 38, through means such as a suitable ball or roller 55, to indicating parts within an indicator 20, 20', will thus be seen to result from orbital displacement of the geometrical axis of bearing shaft 15'; and the correct interpretation of any graph traced by the indicator may accordingly depend upon proper synchronization of rotative movements and upon a proper initial positioning of the bearing shafts 15, 15'.

For the purpose last referred to, the bearing flange or flanges 16, 16' may be graduated in degrees and so set that the zero thereon corresponds to a base line on a graph-receiving indicator sheet or surface; and whatever radial plane of a shaft or unit undergoing test may happen to come opposite the zero on the flange or flanges 16, 16' may be arbitrarily marked, and treated throughout subsequent operations, as the "zero" radial plane, or plane of reference, of the said shaft or unit. For example, connections may be such that when the zeros on flanges occupy front positions, as at starting, reflected beams of light stripe the base lines of the indicators.

The base 19 of instrument 20 may be fixed, and the base 19' of instrument 20' may be adjustable longitudinally of rails provided upon the bench 11, these parts being so rugged as not to participate in any vibrational movements herein referred to; and positioning of the instrument 20' and all parts movable with the base 19' will be understood to depend upon the length of a batch of shafts, or the like, in hand to undergo test.

The indicator or indicators 20, 20' may be substantially similar to those shown and described in my pending application S. N. 315,509, filed October 27, 1928, except that shaft sections 28, 28' are herein shown as extending horizontally (this use of horizontal shafts being largely a matter of convenience) and as provided with longitudinal keyways,—to permit the adjustments above referred to; and the shaft 28' is shown as supported at intermediate points by means including bearings 56, 56',—such as may be advantageously provided upon a pair of safety devices 57, 57'. These are shown as each including a curved guard part 58, pivoted at one end on a pin 59 and engageable at its opposite end by a retaining device 60; and the shafts 28, 28' are shown as also provided with bearings in the respective instrument housings,—the mechanisms employed to rotate therefrom the shaft of a beam-reflecting mirror 219 being modified accordingly.

As in the mentioned prior application, when intended to be used as described, indicator 20 and/or 20' may comprise, within a housing 220, not only the mentioned rotating or beam-reflecting mirror (whose sides or faces may correspond in number with a speed-reduction ratio between shafts 15 and said mirror shaft, the illustrated mirror being octagonal in cross-section) but also an oscillatable concave mirror or finger-shifted reflector 221 (movable by any suitable indicator-actuating element, such as the mentioned finger 38), a light source 222, and an arcuate window opening 223 having therein a suitable curved graph-receiving or graph-displaying translucent element 224,—a ray-restrictive element 225 and a background illumination window containing color-diffusion screen 226 being optionally provided in or carried by an inner wall or walls 228, defining a lamp compartment 229.

The curvature of the oscillatable mirror 221 is preferably such that an unvarying ray which it receives through an aperture 230 in the ray-restrictive element 225 (shown as retained in an adjusted position by a slotted plate 231 and clamping screws 232) shall be approximately focused, as reflected from the rotating mirror 219, in the plane of the graph displaying element 224,—this being secured at a uniform radial distance from the axis of rotation of mirror 219 and of such extent as to receive a straight or curved line of light corresponding, as to the period involved in its production, with a single revolution of the shaft 29, or with a single cycle in the movement of the finger 38, or equivalent element.

The lamp 222 may be rendered adjustable in any desired planes by means such as threaded elements 233, 233', 234, adapted to serve as set screws and/or to extend through slots such as that shown at 235 in a bracket 235'. A door or pivot-supported section 236 of housing 220, optionally mounted upon hinges 237 at or near the center of the back of said housing, may provide for easy access to the lamp compartment and mentioned elements therein; and said compartment may be provided with any desired heat-escape or ventilating means,—such as, for example, a "stack" 238, shown as provided with a screen 239.

Pivotally to support the oscillatable mirror 221 for movement in a plane such as to assure continuous reflection from one or another of the reflecting surfaces of mirror 219 during each complete revolution of a "spinning" shaft or any work unit undergoing test, and to render the oscillatable mirror 224 directly responsive to movements of some shiftable element such as finger 38 of a floating or other "feeling" organization, a forward extension 240 of housing 220 being shown as interiorly provided with a shelf 241, apertured at 242, a removable frame 243 is shown as interfitting within the aperture 242 and as carrying not only an inclined shaft 244 for mirror 221 but a vertical transmission shaft 245,— said shafts being interconnected by means of equal or unequal gears or gear sections 246, 247, and said transmission shaft being equipped with an adjustably carried roller-tipped multiplication lever or finger 248. A mentioned ball or roller 55 upon said finger may be retained in constant engagement with a suitable cam surface 38', near the end of finger 38 or upon any element used to transmit in opposition to a spring 250, the movements that are to be observed. Said spring is shown as engaging a lower horizontal element 251 of frame 243 and a mirror-receiving block 252; and a desired initial setting may be facilitated by means such as set screws 253, 254, 255, and 256.

To facilitate insertion and removal of the oscillating mirror frame 243 and/or the rotating mirror 219, an upper portion 257 of the indicator housing extension 240 may be separately formed and removable (as, upon the withdrawal of screws 258, shown as entering or engaging shelf 241); and the rotating mirror 219 may be provided at its inner end with an interfitting part of a torque-transmitting coupling comprising elements 259 and 260,—the outer end of said mirror, or the shaft thereof, being shown as provided with a concave bearing element 261, engageable by a spring-pressed bearing cone 262, which is slidably retained within a suitable thimble 263. Chromium plated stellite is regarded as superior to steel for use in providing a true, highly reflective and permanent mirror 219; mentioned bearing elements, when separately formed, may be secured in any preferred way,—as, by a shrinking-on or by the use of binding screws 264 upon kerbed bearing elements; motion may be imparted to the bearing or coupling element 260, or its equivalent, by means such as an intermediate shaft section 265, shown as carried in a bearing 266; and, in case rotary motion is to be transmitted thereto from one of the shaft sections 28, 28' any desired system of intermediate gears, and any suitable lubricating system, may be employed within the housing 220, or within a subsidiary housing 267,—shown as provided with a removable cover 268.

Figure 7:
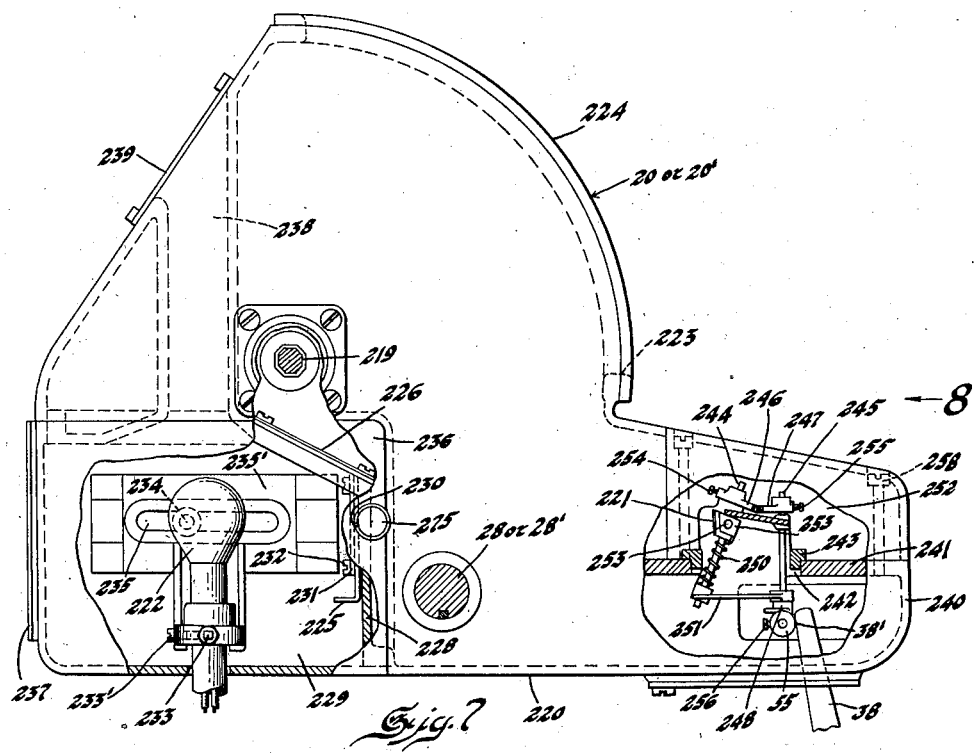
Figure 7 is a partial transverse sectional view showing, in side elevation and with parts broken away, a preferred type of indicator.
Figure 8:
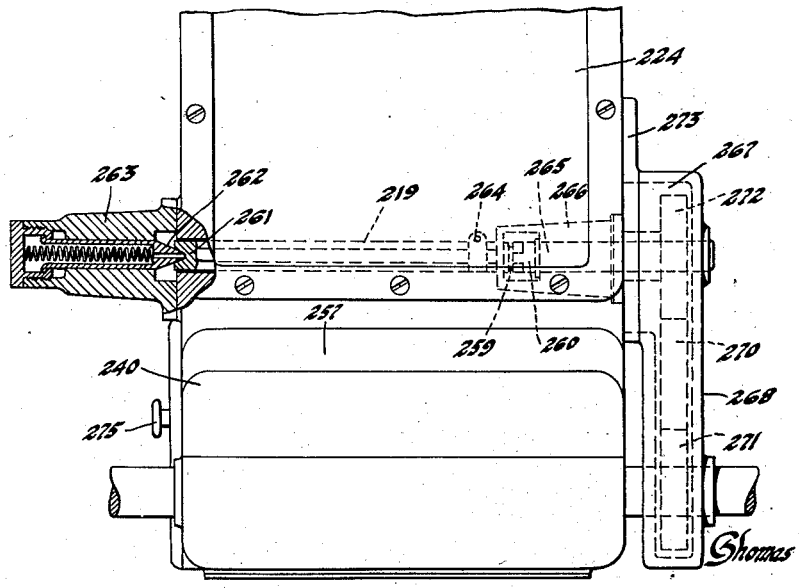
Figure 8 is an elevational view, with parts broken away, taken substantially as indicated by the arrow 8 of Figure 7.

For example, the mentioned housing 267 and/or cover 268 may include bearings for the shaft 269 of an idler gear 270, suitable for the transmission of motion from a gear 271 on shaft 28 or 28' to a gear 272 on shaft 266; and bearing 266 may extend inward from a "flat" or plate 273, to which housing 267 and cover 268 may be secured by means such as screws 274. The door 236 may be manipulated by means such as a knob 275; and the forward extension 240 of the indicator housing 220 must obviously be provided with some additional opening through which finger 38 may upwardly extend as indicated in Fig. 7; but the exact details of parts such as those last referred to are obviously of very minor importance herein,—being mentioned only for the sake of completeness of description.

As to operation, it will be understood that rotation of a reflecting surface of the mirror 219 is effective to produce, incidentally to the rotative advance of said reflecting surface and according to the rate of said rotation, the appearance of an advancing spot or a straight or curved line of illumination upon the translucent element 224; and the distinctness of the effect referred to may be enhanced by the use of the mentioned colored screen 226, to provide a diffuse illumination of green or other colored light,—affording a background upon which the mentioned line of indication is clearly visible. A complete or partial hood (not shown) may be provided thereover; and it will be understood that the translucent element 224 may be provided with any desired lines, graduations, legends or other markings, for the purpose of aiding the eye in judging, or a sensitized sheet in recording, any curvature implying an eccentric rotation of a bearing shaft 15 or 15'. The angular disposition of any actual or virtual excess of material, and the amount of any such excess (tending to displace the geometrical axis at one end of propeller shaft or like unit undergoing test, upon supporting and spinning the same in substantially the manner of its intended subsequent use, but so as to permit it to find its own axis of rotation) will be seen to be revealed by the deviation of a sine curve from a straight vertical line; and the indicators 20, 20' have accordingly been referred to as "sine-wave" indicators.

In order to obviate an end-for-end turning of any shaft assembly, to complete a test thereon, and in order to obtain simultaneous readings of simultaneous vibrations as the same may be modified by interaction, in preferance to producing two graphs in different colors upon the face of a single instrument, separate instruments 20, 20' are herein employed.

One of the bearing assemblies 14, 14' (or both of said assemblies, in case both are of floating type) may be provided with means to facilitate a centering of the bearing shaft or shafts 15, 15', during insertion of a shaft or other work unit 18 and/or during the starting of the motor 13; and the means last referred to may advantageously be of such type as also to facilitate the initial positioning of the graduated flanges 16, 16' at zero or at any desired angle. For the purposes last referred to, a tubular extension 362 is shown in Figure 6 as adapted not only to contribute to the retention of mentioned bearings 34 within floating blocks 33 but to receive a portion 15a of shaft 15,—which may be held concentrically therein by means including a gland organization 363; and the tubular extention 362 is shown in Figures 5 and 6 as including ratchet-like elements having cam surfaces,—radial tooth surface 365 thereon being adapted to engage cooperating ratchet-cam tooth surface 366 upon a manually manipulatable sleeve element 367, and cam surface 368 upon said tubular extension being adapted to engage arcuate surfaces 369 in such manner as to hold the bearing shaft 15 or 15' centrally within the manually manipulatable element sleeve 367 when desired. The element last referred to is shown as provided with an upwardly extending handle 370; and the relationship between the mentioned parts may be such that said handle may be used to "ratchet" a flange 16 or 16' to any position. When said handle is vertically disposed the graduated flange 16 or 16' may be brought to zero (or to 120° or 240°).

Figure 11:
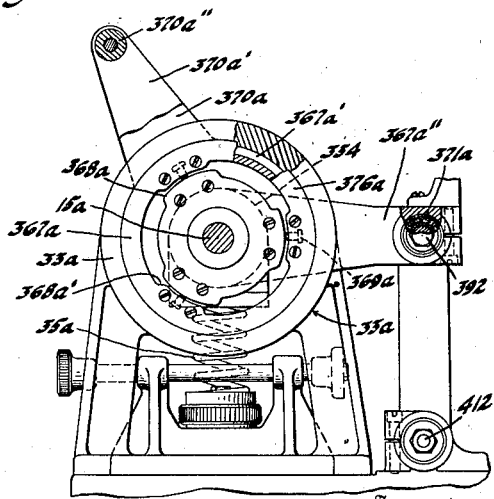
Figure 11 is a view corresponding to a part of Figure 4, but showing a recently developed modification.

The form shown in Figure 11 is similar to that just described but more rugged,—sleeve element 367a being duplicated at 367a', and a horizontal handle 367a'' being interposed between radial handle elements 370a and 370a'. A single vertical spring is employed at 35a, adjustable damping may be effected by means such as compressible annuli 371a surrounding pins 392 and 412, and replacable cam screws or pins 369a are shown as adapted externally to engage ratchet-cam elements 368a, 368a' upon the ends of a floating bearing box 33a, containing bearing shaft 15a.

The propeller shaft 18 is shown as comprising universal joints at 372 and 372' and a spline at 373, as well as the flanges 17, 17'; and it will be noted that positioning of the latter between flanges 16, 16' must dispose the same concentrically therewith. The power of the compression spring 35 or 35a is intended to be such that the weight of the mentioned coaxial elements and parts thereon, and the pressure of the spring 35', if employed, shall initially give the axis of bearing shafts 15, 15' a substantially central position, such as that illustrated in Figure 4,—or such as would occasion no movement of finger 38, by which an indicator 20, 20' is actuated; but any deviation of a work unit 18 from the central position referred to, or any deviation of a manually manipulatable element 367 or 367a or 367a' from a concentric position, is sufficient to assure engagement of one or another of the teeth 365 for a zero-setting or other positioning effect, as above referred to; and such deviation may be effected by a momentary manual pressure upon shaft 18 or on a part secured thereto (or upon a handle 370 or 370a', if sleeve element 367 or 367a and 367a' are allowed some play).

Before or after the mentioned zero setting operation, the mentioned play-limiting element or elements 58 are intended to be brought to closed position, by means of handles 374'; and said elements may be advantageously provided not only with the mentioned retaining devices 60, including latch bolts adapted to extend through openings 375 in the free ends thereof, but with some means rendering the starting of the motor 13 conditional upon an additional voluntary act.

For example, a slidable frame 376, supporting the safety devices, may support also a control organization 377, included within a circuit 378, 378', serving for the energization of said motor upon the manipulation of any suitable speed-varying device such as is suggested at 379, Figure 1. The control device referred to may comprise resilient and curved terminal elements 380, 380', secured to the respective wires of the mentioned circuit and so disposed, near a bridging conductive element 381, as to close a circuit therethrough only when depressed; and depression thereof may be effected by means such as separate small plunger rods 382, 382', normally held elevated by means such as springs 383. Thus when a play-limiting guard element 58 is lowered into its latching position, entering within a keeper 384 through which a mentioned bolt of the latch organization 60 is movable, incidental depression of the rod 382, terminally provided with an insulating head 385, may cause a conductive contact of the resilient element 380 with the bridging element 381; and means such as a cam surface 386, shown as comprised in the latch organization 60 and manipulatable by its handle 387, may be employed similarly to depress the rod 382', to effect a contact between the resilient element 380' and said bridge, in readiness for the starting of motor 13. When no means for indicating R. P. M. are included in instruments 20, 20', the speeds at which any vibrational effects occur may then be noted on an electrical or other tachometer 388, driven from some mentioned shaft—such as shaft (27, 28 or) 29.

The general mode of operation in the respective parts comprised in the present invention having been indicated in connection with the description thereof, it should be understood that, whether or not means such as manually manipulatable elements 367 or 367a are so employed, in connection with one or more floating bearing assemblies, as momentarily to center the described bearing shaft or shafts while the motor 13 is speeding up, the said bearing shaft or shafts are to be left free to float during the actual test,—as by a shifting of handles 370, 370', 370a' to positions such as that shown in Figure 5; and the amount and location of any actual or virtual unbalance effecting either or both ends of the work unit 18 (which will be seen to be terminally secured in substantially the same manner as if in actual use and which may be rotated at a speed such as that of normal use, or use under extreme conditions) will then be graphically indicated by a corresponding sine curve or curves, upon the indicator or indicators 20, 20',—the positions and the dimensions of any lateral "humps" in the graphs being respectively indicative of the angular positions and the amounts of any resultant unbalance or unbalances sufficient to cause vibration by eccentric movement or whip under the conditions referred to. For example, a central hump, extending halfway across one indicator sheet at (say) 1500 R. P. M. may imply a local or "resultant" excess of material corresponding to (say) two oz. in. at one end of the shaft 18 and at an angle of 180° from the adopted zero radial plane thereon; and a "hump" of half this size located ¾ of the way up the other indicator face may then imply a local or resultant excess of material at the other end of the shaft, corresponding to one oz. in. and at an angle of 270° from the same zero plane.

Figure 10:
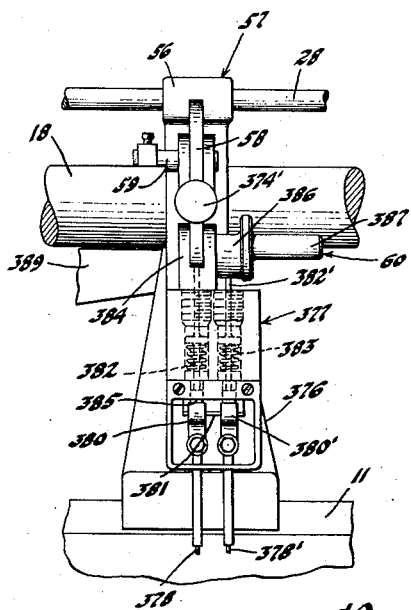
Figure 10 is a partial elevational view, taken substantially as indicated by the arrow 10 of Figure 9.

Although correction of faults revealed in the above manner might obviously be affected by a removal or addition of material at points indicated, it is found that slight straightening or other bending operations afford an expeditious, clean and convenient method of correction. Straightening may be effected and results thereof confirmed, if desired, without removing the tested shafts or other units from the described machine; and the method here referred to is somewhat diagrammatically suggested by a showing, in Figures 1, 9 and 10, of laterally shiftable wedges 389, optionally carried by the movbale frames 376 of safety devices 57, 57',—said wedges and frames being adapted to sustain any corrective pressure applied through a hydraulic plunger 390 or the like, also laterally movable. It has been found best in practice that the speeds where unbalanced readings are taken should correspond to at least double the natural frequency of the spring supporting system. By thus operating above the resonance frequency of the spring supporting system greater accuracy is obtainable.

The foregoing description has included complete details of but one embodiment of the present invention; but it should be understood not only that various features of said invention are capable of independent use but also that numerous modifications in detail might easily be devised, by workers skilled in the balancing art and familiar with the foregoing, without the slightest departure from the scope of the present invention.

Spring 35—35' and/or spring 42—43 as well as the damping means 371a of Figure 11, are sometimes referred to in the claims as means for damping the orbital movement of the part to be balanced or its supports, since this is one of the functions of the parts.

I claim:

1. In a balancing machine the combination of a pair of spaced members adapted to support between them a rotatable part to be balanced, means for mounting each of said members so as to permit movement thereof in any direction in planes perpendicular to the axis of rotation of said part and to prevent movement in any other direction, means for rotating said part, and means for indicating vibrational movements of said part due to unbalance.

2. In a balancing machine the combination of a base, a link pivoted to the base, a second link pivoted to the first-named link, means yieldingly resisting turning movement of said links, a bearing associated with said second link adapted to receive a rotatable part to be tested for unbalance, means for rotating said part, means for indicating vibrational movement of one of said links due to unbalance of said part, a support adjacent said bearing, and centering means carried by said support adapted to engage and center said bearing.

3. In a balancing machine the combination of a base, a link pivoted to the base, a second link pivoted to the first-named link, means yieldingly resisting turning movement of said links, a bearing associated with said second link adapted to receive a rotatable part to be tested for unbalance, means for rotating said part, a finger carried by one of said links, and an indicator means operated by said finger.

4. In a balancing machine the combination of a base, spaced links pivotally mounted on the base, links pivoted to the first named links, bearings associated with said second named links, means yieldingly resisting turning movement of said links, said bearings adapted to receive a rotatable part to be tested for balance, means for rotating said part, and means for indicating vibrational movement of said part due to unbalance.

5. In a balancing machine the combination of a base, spaced links pivotally mounted on the base, links pivoted to the first-named links, bearings associated with said second named links, means yieldingly resisting turning movement of said links, said bearings adapted to receive a rotatable part to be tested for balance, means for rotating said part, means for indicating vibrational movement of said links due to unbalance, supports adjacent said bearings, and centering means carried by said supports adapted to engage and center said bearings.

6. In a balancing machine, the combination of a base, spaced links pivotally mounted on the base, links pivoted to the first named links, bearings associated with said second named links, means yieldingly resisting turning movement of said links, stub shafts mounted in said bearings adapted to support between them a shaft to be balanced, and means for rotating one of said stub shafts, and means for indicating vibrational movement of said links due to unbalance.

7. In an organization for ascertaining unbalance in a unit of propeller shaft type, spaced means for receiving the ends of said unit and supporting it substantially as if in its intended use and providing a floating mounting therefor, each of said means comprising a pitman-like arm and a bearing for the unit associated with each arm, means for rotating the unit in said bearings, means for indicating unbalance, and means for transmitting movement from each of said spaced means to said indicating means to operate the latter.

8. In a balancing machine the combination of a base, a link pivoted on the base, a second link pivoted to the first-named link, a bearing for a rotatable part associated with said second-named link, means for yieldingly resisting pivotal movement of said links, means for rotating a part to be balanced when mounted in said bearing whereupon the part, if out of balance, performs a yieldingly resisted orbital movement, and means operated by orbital movement of said part for indicating unbalance.

9. In a balancing machine the combination of a base, a pair of members movably connected to the base at spaced points, members pivotally connected to the first-named members, means for yieldingly resisting movement of said second named members, bearings associated with the second-named members adapted to receive and support between them a rotatable part to be balanced, means for rotating said part, said members permitting orbital movement of said part so as to assume a position of rotating balance, and means operated by orbital movement of said part for indicating unbalance thereof.

10. In a balancing machine, the combination of a base, a pair of members movably connected to the base, members pivotally connected to the first-named members, means for yieldingly resisting movement of said second-named members, bearings associated with said second-mentioned members adapted to receive and support between them a rotatable part to be balanced, means for rotating said part, said members permitting orbital movement of said part so as to assume a position of rotating balance, means associated with each end of said part and operated by orbital movement of said part for indicating unbalance thereof, and means for locking either of said bearings against movement so as to obtain a reading of out of balance of the opposite end of said part.

11. In a balancing machine the combination of a plurality of spaced journal bearings adapted to receive in them the ends of the part to be balanced, means for supporting said bearings for independent orbital movement of revolution in parallel planes only, means for rotating a part mounted in said bearings, means for yieldingly resisting said orbital movement, and means operated by orbital movement of the bearing for indicating unbalance of a part under test.

12. In a balancing machine for jointed shafts and the like, the combination of spaced bearings adapted to receive the ends of a shaft to be balanced, means for mounting each of said bearings so as to permit movement thereof in any direction in planes perpendicular to the axes of the bearings, and to prevent movement of the bearings in any other directions, means for yieldingly resisting movement of each of said bearings in said planes, means for driving a shaft when mounted in said bearings, and means operated by orbital movement of the shaft for indicating unbalance thereof.

13. In a balancing machine for jointed shafts and the like, the combination of spaced bearings adapted to receive the ends of a shaft to be balanced, means for mounting each of said bearings so as to permit movement thereof in any direction in planes perpendicular to the axes of the bearings and to prevent movement of the bearings in any other directions, means for yieldingly resisting movement of said bearings in said planes, means for driving a shaft when mounted in said bearings, means associated with each of said bearings and operated by orbital movement thereof in response to unbalanced movement of the shaft for indicating such unbalance, and means for locking either of said bearings against movement to permit reading of unbalance at one end of the shaft only.

14. In a balancing machine for jointed shafts and the like, the combination of a support, links pivoted to the support at spaced points, means yieldingly resisting movement of the links, links pivoted to the first-named links and normally extending at substantially right angles thereto, means yieldingly resisting movement of the second-named links, bearings for receiving the ends of the shaft to be balanced, associated with the second-named links, means for driving a shaft when mounted in said bearings, and means operated by orbital movement of the shaft for indicating unbalance thereof.

15. In a balancing machine for jointed shafts and the like, the combination of spaced mountings adapted to be engaged with the ends of a shaft to be balanced so as to permit rotation thereof, said mountings each comprising means permitting movement of the ends of the shaft in any direction in planes perpendicular to the axis of the shaft and preventing movement thereof in any other direction, means associated with each of said mountings for yieldingly resisting movement of said ends in said planes, means for driving a shaft when engaged with said mountings, and means operated by orbital movement of the shaft for indicating unbalance thereof.

16. In a balancing machine for jointed shafts and the like, the combination of spaced mountings adapted to be engaged with the ends of a shaft to be balanced so as to permit rotation thereof, said mountings each comprising means permitting movement of the ends of the shaft in any direction in planes perpendicular to the axis of the shaft and preventing movement thereof in any other direction, means associated with each of said mountings for yieldingly resisting movement of said ends in said planes, means for driving a shaft when engaged with said mountings, means associated with each of said mountings and operated by orbital movement of said shaft in response to unbalance therein for indicating such unbalance, and means for locking either of said bearings against movement to permit reading of unbalance at one end of the shaft only.

THOMAS C. VAN DEGRIFT.